Nov. 6, 1951 R. C. SANDERS, JR., ET AL 2,573,734
CALIBRATOR
Filed Aug. 20, 1945 2 SHEETS—SHEET 1
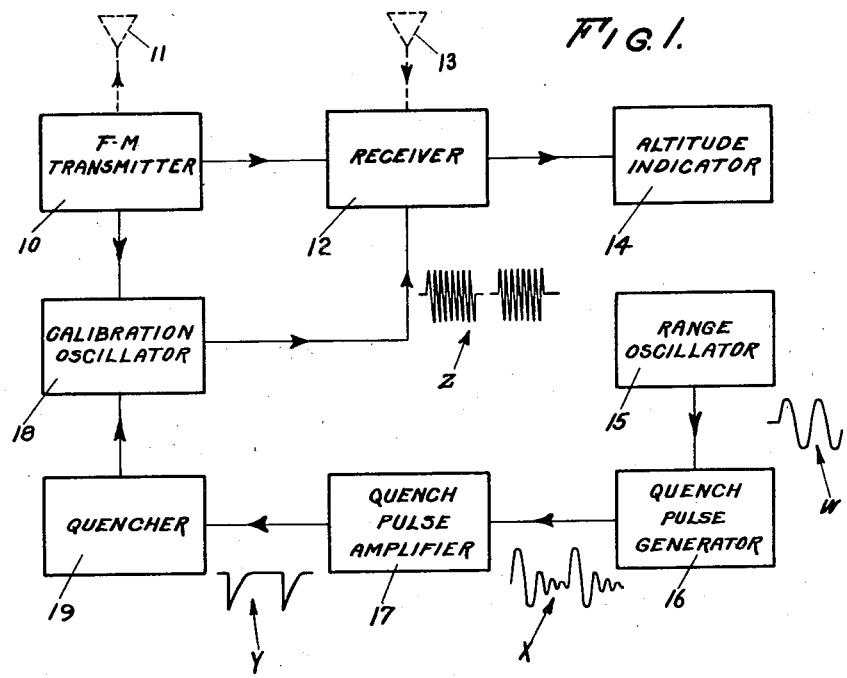
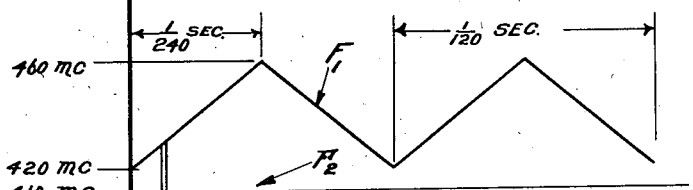
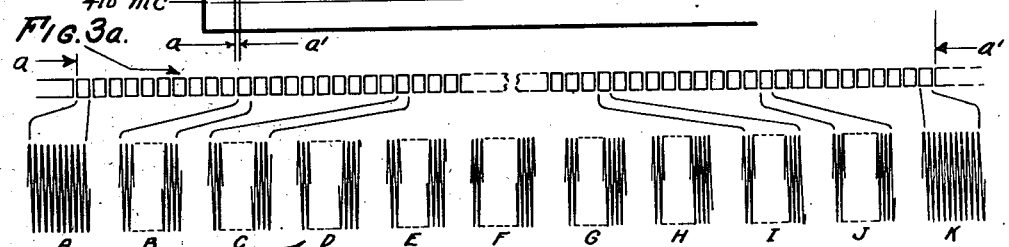
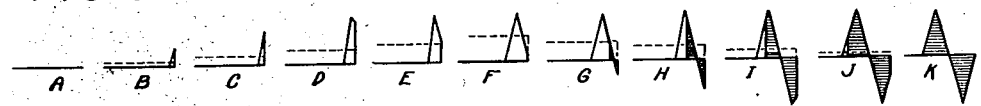
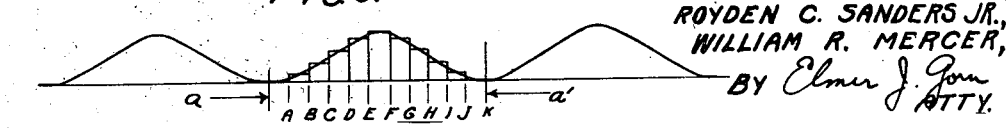
INVENTORS.
ROYDEN C. SANDERS JR.,
WILLIAM R. MERCER,
BY Elmer J. Gorn
ATTY.

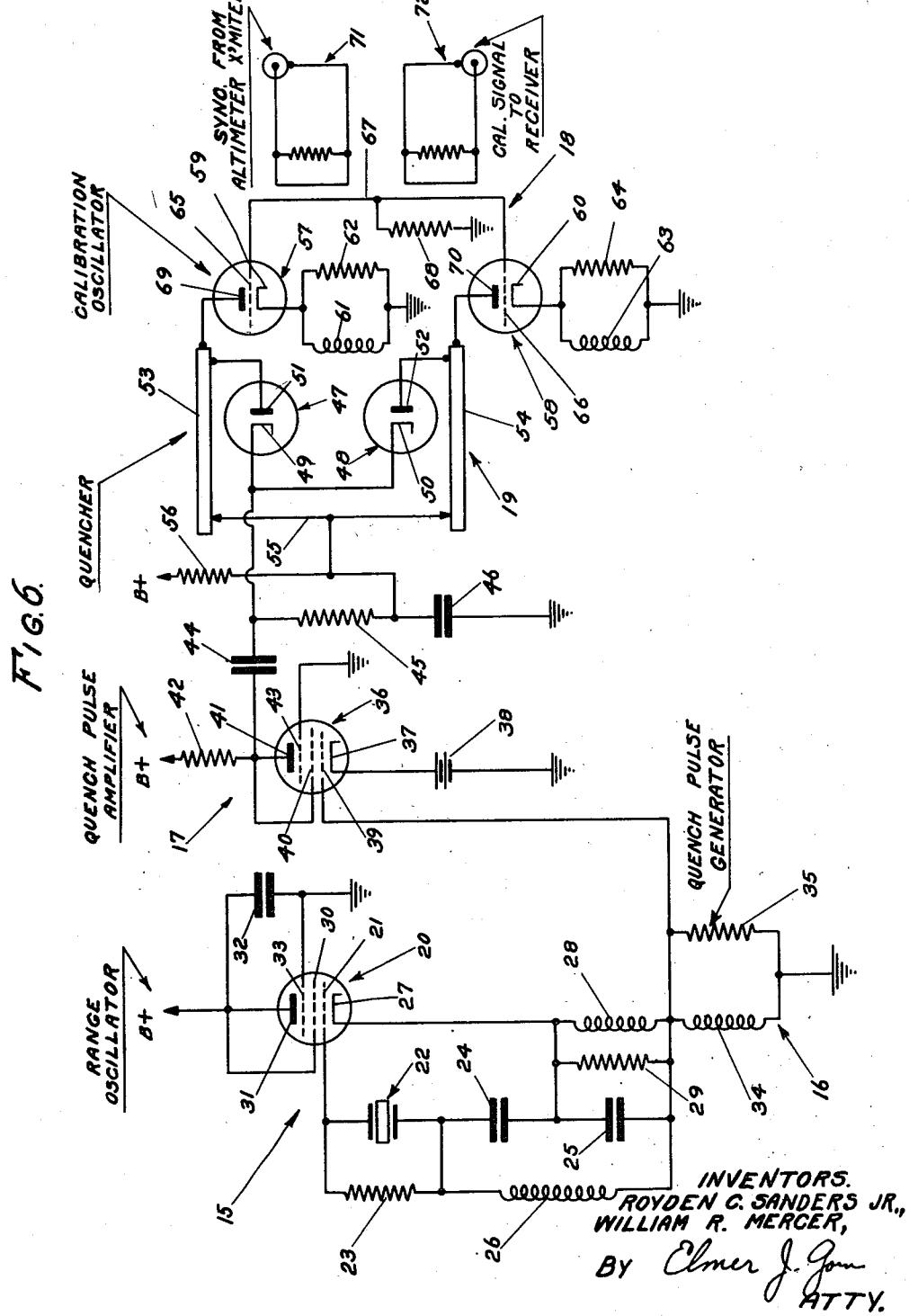

Patented Nov. 6, 1951

2,573,734

UNITED STATES PATENT OFFICE 2,573,734

CALIBRATOR

Royden C. Sanders, Jr., Chestnut Hill, Newton, and William R. Mercer, Belmont, Mass., assignors to Raytheon Manufacturing Company, Newton, Mass., a corporation of Delaware Application August 20, 1945, Serial No. 611,660

14 Claims. (Cl. 343—14)

Our present invention relates to signal generators, and more particularly to signal generators suitable for use in calibrating radio altimeters of the frequency-modulated type.

Such altimeters generally determine absolute altitude as a function of the total time required for a radio signal generated in an aircraft to travel to and from the earth.

In the F.-M. type to which reference has been made, the frequency of a C.-W. transmitter is recurrently swept through an appropriate frequency band at a relatively low, audio-frequency rate, and the resulting F.-M. signal is beamed toward the earth. Upon reaching the earth, a portion of the energy of said signal is reflected thereby, and, eventually, the reflected signal is received back at the aircraft, where it is heterodyned with the signal instantaneously being transmitted. Now, during the time required for the originally transmitted signal to travel to the earth and return, the frequency of the altimeter transmitter changes by a small percentage of the bandwidth thereof, and therefore, the mixing of the reflected signal and the signal instantaneously being transmitted results in a beat note whose frequency is a function of said travel time. Said beat note is applied to a suitable indicator, usually, of the cycle-counting type, whose meter scale is graduated directly in terms of altitude.

Obviously, such an altimeter indicator requires calibration, and this is most conveniently accomplished by applying thereto a synthetic signal simulating that produced by an actual signal returning from the earth to a given altitude.

Devices heretofore employed to generate such a synthetic signal have not been sufficiently accurate, and it is, therefore, the main object of our present invention to overcome this difficulty and provide a signal generator, and a method of utilizing the same, which is extremely accurate and reliable.

This, and other objects of our present invention, which will become more apparent as the detailed description thereof progresses, are attained, briefly, in the following manner:

We provide a radio-frequency generator, hereinafter referred to as the calibration oscillator, which is adapted to generate electrical oscillations of a frequency, preferably, outside of the band swept by the F.-M. transmitter of the altimeter to be calibrated, for example, a few megacycles below the lower limit of the altimeter transmitter band.

The calibration oscillator is quench-modulated by another, very stable oscillator, hereinafter referred to as the range oscillator, the latter being adapted to generate electrical oscillations, preferably, of a frequency whose period is approximately equal to the time-equivalent of a predetermined altitude at which it is desired to calibrate the altimeter. The resulting alternate free-running and quenched periods of the calibration oscillator are thus precisely controlled as to time duration.

A small amount of the output of the altimeter transmitter is coupled to the calibration oscillator to assure the fast starting thereof, and to synchronize its break-away to free-running operation.

The calibration oscillator output is mixed with the altimeter transmitter output in the altimeter receiver. It will be noted that during each free-running period of the calibration oscillator, the altimeter transmitter frequency shifts over a portion of its band, and as a result, an audio-frequency beat signal is developed in the altimeter receiver during many successive free-running periods. This beat signal is a replica of that which would normally be produced during actual operation at the selected calibrating altitude, and when this signal is applied to the altimeter indicator, the deflection of the meter thereof may be so designated.

In the accompanying specification we shall describe, and in the annexed drawings show, an illustrative embodiment of the signal generator of our present invention. It is, however, to be clearly understood that we do not wish to be limited to the details herein shown and described for purposes of illustration only, inasmuch as changes therein may be made without the exercise of invention and within the true spirit and scope of the claims hereto appended.

In said drawings, Fig. 1 is a block diagram of a frequency-modulated radio altimeter, and a calibration-signal generator therefor, assembled in accordance with the principles of our present invention;

Fig. 2 is a graph showing the variation with time of the altimeter transmitter frequency, as compared with the fixed frequency of the calibration oscillator;

Fig. 3a shows a number of oscillation envelopes of the R.-F. beat signals developed during a succession of the free-running periods of the calibration oscillator, from which the hereinbefore referred to audio-frequency beat signal may be extracted;

Fig. 3b shows a number of said oscillation envelopes in expanded form;

Fig. 4 shows the development of a varying average voltage from said oscillation envelopes;

Fig. 5 shows the development of the audio-frequency beat signal from said varying average voltage; and Fig. 6 is a circuit diagram of the signal generator of our present invention.

Referring now more in detail to the aforesaid illustrative embodiment of our present invention, and with particular reference to the block diagram shown in Fig. 1 of the drawings, the numeral 10 designates an altimeter transmitter. Such a transmitter may comprise an R.-F. generator adapted to be frequency-modulated, for example, over a band extending from 420 mc. to 460 mc., at a recurrence rate of 120 c. p. s. While not limited thereto, it will be assumed for purposes of explanation that the frequency modulation is triangular.

The output of the transmitter 10 is fed to an appropriate antenna 11 to beam the same toward the earth. A portion of said output is also fed to an altimeter receiver 12, wherein it is heterodyned with the reflected signal picked up by a receiving antenna 13. The resulting beat note, whose frequency is a function of the travel time of the originally transmitted signal to and from the earth, and is, therefore, an indication of altitude, is applied to an altitude indicator 14, for example, of the cycle-counting type, whose scale is graduated directly in terms of altitude.

During the calibration of the above-described altimeter, the transmitter output is not radiated, and the reflected signal normally applied to the receiver in actual operation is replaced by the synthetic signal developed by the calibrator of our present invention.

Said calibrator comprises a very stable range oscillator 15, which is, preferably, crystal-controlled, and adapted to generate electrical oscillations W, assuming it is desired to calibrate the altimeter at approximately 380 feet, of a frequency of 1300 kc., corresponding to a period of .77 microsecond, which is the time it takes for a radio wave to travel 380 feet to a reflecting object and return, over the same distance, to its point of original transmission, hereinafter referred to as the time-equivalent of an altitude of 380 feet. Once during each cycle of operation, said oscillator develops a sharp pulse across a pulse generator 16, which may take the form of a highly damped inductor having a resonant frequency, for example, of approximately 7 mc., corresponding to a half period of approximately .05 microsecond. Once excited, such a circuit continues to oscillate at its natural period with diminishing amplitude.

The wave train developed in the generator 16 is applied to a pulse amplifier 17 so designed that only the first positive half-cycle of said wave train is passed thereby, and this, in the form of a sharp negative pulse Y.

The calibration oscillator 18 may comprise a push-pull, tuned-grid, tuned-plate, fixed-frequency generator, using plate and grid lines as the frequency-controlling elements, and operating at a frequency outside of the band of the altimeter transmitter 10, for example, 410 mc. A portion of the output of the altimeter is loosely coupled to the calibration oscillator to synchronize the same at the start of each free-running period thereof.

A quencher 19, in the form of full-wave rectifiers connected across the plate line of the calibration oscillator, is adapted to receive the sharp negative output of the pulse amplifier 17, and become conducting so as to quench the calibration oscillator and absorb therefrom any residual oscillation energy.

Thus, the calibration oscillator 18 has alternate free-running and quenched periods which are precisely controlled as to time duration. The output Z of the calibration oscillator is fed to the altimeter receiver 12, along with a portion of the output of the altimeter transmitter 10, and, as will now be described, an audio-frequency beat note is obtained which simulates that produced under actual operating conditions at the chosen calibrating altitude.

Fundamental to the operation of the calibrator of our present invention are these two facts: (1) that the calibration oscillator does not oscillate continuously, but is periodically quenched at a precisely controlled rate so that it oscillates freely for accurately controlled intervals of time; and (2) that no oscillation energy remains to fix the initial phase of successive periods of operation. The loose coupling between the altimeter transmitter and the calibration oscillator initially starts the latter and momentarily synchonizes it with said altimeter transmitter, but once started and properly phased, the calibration oscillator is not held in synchronism with the altimeter transmitter, and it breaks away into operation at its own frequency.

By initially phasing the calibration oscillator, the beat-frequency difference is likewise phased. The number of beat-frequency cycles produced during any free-running period of the calibration oscillator depends upon the instantaneous frequency of the altimeter transmitter and the duration of the free-running period during which the sweep of the altimeter transmitter takes place. While the frequency of the altimeter transmitter, and also, that of the beat note, actually change slightly during each free-running period of the calibration oscillator, this slight shift may be neglected for explanatory purposes, and the two frequencies will be considered fixed during any free-running period.

In the example under consideration, the beat-frequency difference between the altimeter transmitter output and the calibrator output varies between approximately 10 mc. and 50 mc., but obviously these frequencies will not pass through the audio-frequency section of the altimeter receiver. The same is also true of the quench frequency, which occurs as an amplitude modulation of the calibrator output. There remains, however, an audio-frequency component in the receiver output, for the development of which reference is now made to Figs. 2 to 5, inclusive, of the drawings.

In Fig. 2, two complete frequency sweeps $F_1$ of the altimeter transmitter are shown, each sweep cycle consuming 1/120th second. In this figure, there is also shown the fixed frequency $F_2$ of the calibration oscillator, and a small portion $a$—$a'$ of the bandwidth swept by the altimeter frequency $F_1$. During said small portion $a$—$a'$, a certain number of calibration oscillator free-running periods occur, and during each of these free-running periods, R.-F. beat frequencies are generated. These are shown, considerably expanded, in the form of oscillation envelopes in Fig. 3a of the drawings. At a time when the swept bandwidth is increasing in frequency, the total number of beat-frequency cycles produced in each successive free-running period increases incrementally over the number formed in the preceding period. In a given number of free-running periods, the addition of an incremental part of a beat-frequency cycle per period eventually results in the addition of a full beat-frequency cycle.

Fig. 3b shows further expanded a few of the R.-F. beat-frequency envelopes A to K, inclusive, of Fig. 3a. Inasmuch as the incremental change per free-running period is so small, only every nth period has been expanded in order to make it possible to show a greater period-to-period cyclic change. The R.-F. beat cycles have been completely drawn in the first and last expanded envelopes A and K there being ten complete cycles in the first, and eleven in the last. Only the first few and last few cycles have been actually shown in the intervening expansions, this, for the purpose of showing the initial phasing and the fractional cyclic change per period. Be-between any two adjacent trains shown in Fig. 3b, one-tenth of a complete cycle is added.

Now, the beat-frequency difference formed in the altimeter receiver produces an average voltage which varies in a cyclic manner at an audio-frequency rate. Assuming a number of complete R.-F. beat-frequency cycles to be formed in any free-running period, the average voltage developed would be zero, but the presence of a fractional part of a complete cycle, following a number of complete cycles in any free-running period, results in a positive average voltage.

Again considering the periods A to K, inclusive, the fractional part of a complete cycle shown at the end of each train in Fig 3b contributes an average potential for each such period, as plotted in Fig. 4, where the height of the dotted line shows the average potential level in each period, and the cancellation of positive and negative cycles is shown by the shaded areas.

The average voltages developed in the selected periods, and shown greatly expanded in Fig. 4, have been plotted closer together in Fig. 5, resulting in a step curve. Obviously, if a more detailed plot of the average voltages contributed by each free-running period during the time interval a—a' were to be made, a smoother curve would result. Such a smoother curve is drawn superimposed on the step curve to present a closer approximation of the audio-frequency cycle as it is actually formed. The resulting signal is amplified and applied to the altimeter altitude indicator to provide the desired calibration at the chosen calibrating altitude.

In the description thus far, it has been assumed that the altimeter is being calibrated at a relatively low altitude. Altimeters of the type being considered generally include a high-altitude range as well, and it is desired to point out that the calibrator of our present invention can be used to calibrate the high range in the same manner as has been described in connection with the low range. There is this difference, however. When the altimeter is used on the high range, the altimeter transmitter bandwidth is a fraction, for example, one-tenth, of that employed on the low range. Likewise, the beat-frequency output of the altimeter receiver varies only one-tenth as much on the high range as it does on the low range. It follows that high-range operation requires fewer, longer-duration free-running periods, with a greater fractional part of a complete cycle being generated per period, to complete the development of a single cycle of the audio-frequency difference signal. In order to comply with these conditions, the range oscillator 15 of the calibrator of our present invention, instead of operating at the frequency hereinbefore referred to, namely, 1300 kc., is adjusted in any conventional manner so that it operates, for example, at 130 kc.

A complete description has now been given of the manner in which the calibrator of our present invention functions to apply to the altimeter a signal simulating that produced in actual operation at a selected altitude, and we shall now describe one form of circuit which may be utilized to generate said signal.

As shown in Fig. 6 of the drawings, the range oscillator 15 may comprise a pentode vacuum tube 20, the control grid 21 of which is connected, through a crystal 22, shunted by a resistor 23, to a tank circuit comprising series-connected capacitors 24 and 25 shunted by an inductor 26. The junction of said capacitors 24 and 25 is directly returned to the cathode 27 of said tube 20, and the cathode side of the tank circuit is returned to said cathode through the parallel-connected inductor 28 and resistor 29. The screen grid 30 and the plate 31 of the tube 20 are connected to the positive terminal of a suitable source of B voltage (not shown), the negative terminal of said voltage source being returned, through ground and the quench pulse generator 16, to the cathode side of the oscillator tank circuit. Said plate 31 is grounded for R.-F. through a capacitor 32, and the suppressor grid 33 is directly grounded, as shown.

The pulse generator 16 may comprise an inductor 34 shunted by a damping resistor 35, the natural resonant frequency of this circuit being high as compared with the frequency of the range oscillator 15. It has been found desirable to connect the pulse generator into the cathode return circuit of the oscillator 15.

The output of the generator 16, consisting of a succession of damped wave trains corresponding to the positive alternations of the oscillator 15, is applied to the pulse amplifier 17. Preferably, the latter comprises a pentode vacuum tube 36 having its cathode 37 grounded through a C-bias source 38, and its control grid 39 connected to the upper junction of the inductor 34 and resistor 35. The screen grid 40 and the plate 41 of the tube 36 may be connected to the B supply through a resistor 42, and the suppressor grid 43 thereof may be grounded, as shown. The C-bias should be of such value that only the first positive pulse applied to the tube 36 is of sufficient amplitude to cause said tube to conduct, thereby resulting in a negative quenching pulse having a repetition rate corresponding to the frequency of the range oscillator 15, and a width corresponding to a half-period of the pulse generator 16.

The amplified quenching pulse is applied, through a coupling capacitor 44, across a resistor 45 which is grounded through a capacitor 46.

The quencher 19 is connected across the resistor 45, and includes a pair of diodes 47 and 48. The cathodes 49 and 50 of said diodes are tied together and connected to the upper end of the resistor 45, and the plates 51 and 52 of said diodes are connected, respectively, to resonant lines 53 and 54 of the calibration oscillator 18, and through a shorting bar 55 across said lines 53 and 54, to the lower end of the resistor 45. The shorting bar 55 is connected, through a resistor 56, to the B supply.

Inasmuch as the diodes are connected across the plate lines of the calibration oscillator 18, the latter becomes quenched whenever said diodes become conducting. Furthermore, any oscillation energy remaining in the calibration oscillator is absorbed by the quenching diodes.

As stated in earlier portions of this specification, the calibration oscillator 18, preferably, comprises a push-pull, tuned-grid, tuned-plate oscillator, and it may include a pair of triode vacuum tubes 57 and 58 having cathodes 59 and 60 grounded, respectively, through a parallel-connected inductor 61 and resistor 62, and a parallel-connected inductor 63 and resistor 64. The grids 65 and 66 of said tubes are tied together by a grid line 67 which is center-tapped and grounded through a resistor 68, and the plates 69 and 70 of said tubes are connected, respectively, to the plate lines 53 and 54.

The synchronizing portion of the output of the altimeter 19 may be applied to the calibration oscillator 18 through a coupling loop 71 adjacent the grid line 67, and the output of the calibrator as a whole may be similarly applied to the altimeter receiver 12 through a coupling loop 72.

This completes the description of the aforesaid illustrative embodiment of our present invention.

It will be noted from all of the foregoing that we have provided a signal generator which is adapted to generate a synthetic signal for calibrating radio altimeters of the frequency-modulated type. It will further be noted that said synthetic signal is a replica of that produced by an actual signal returning from the earth to a given altitude, and that said synthetic signal is generated under such precisely controlled conditions as to assure the reliable calibration of the altimeter.

While we have described in detail a system which enables the production of a synthetic calibrating signal in the form of the varying average value of the D.-C. component of certain R.-F. beat signals, we wish it to be clearly understood that our present invention is not limited to the use of this particular component. For example, the higher frequency components of the R.-F. beats may, by appropriate modification, be utilized to calibrate the altimeter indicator. Furthermore, the R.-F. beats need not be formed in the altimeter receiver. They may be formed entirely externally of the altimeter itself and fed only to the altimeter indicator.

We wish also to point out that while the calibration oscillator herein described has been stated to be of fixed frequency, said oscillator may be slightly frequency modulated at a low rate which is different from the sweep frequency of the altimeter, so that any fixed error in the altimeter may be averaged out.

We wish further to point out that our present invention is not limited to calibrating an altimeter. It can also be utilized in calibrating various F.-M. distance or velocity-determining systems; or, in fact, wherever it is desired to measure the band sweep, or any part thereof, of any frequency-modulated device.

If our calibrator is utilized to calibrate, for example, an F.-M. radar system, it will be found desirable to slightly frequency modulate the calibration oscillator at a recurrence rate synchronized with the sweep of said system, thereby introducing into the generated synthetic signal the effect produced by relative motion, namely, the Doppler effect.

Other objects and advantages of our present invention will readily occur to those skilled in the art to which the same relates.

What is claimed is:

1. In a signal generator for enabling the calibration of a frequency-modulated distance-determining system including a transmitter and a receiver, the frequency of said transmitter being recurrently swept through a predetermined frequency band: means for recurrently generating a train of electrical oscillations; the period during which each such train of oscillations is generated being substantially equal to the time-equivalent of a predetermined distance at which said system is to be calibrated and the number of cycles in each such train of oscillations being constant; and means for initiating each such train of oscillations in time-phase with the signal being instantaneously generated by said system.

2. In a signal generator for enabling the calibration of a frequency-modulated distance-determining system including a transmitter and a receiver, the frequency of said transmitter being recurrently swept through a predetermined frequency band: means for generating electrical oscillations; means for quenching said oscillations whereby each free-running period thereof is substantially equal to the time-equivalent of a predetermined distance at which said system is to be calibrated; and means for initiating each train of said oscillations in time-phase with the signal being instantaneously generated by said system.

3. In a signal generator for enabling the calibration of a frequency-modulated distance-determining system including a transmitter and a receiver, the frequency of said transmitter being recurrently swept through a predetermined frequency band: means for recurrently generating a train of electrical oscillations; the period during which each such train of oscillations is generated being substantially equal to the time-equivalent of a predetermined distance at which said system is to be calibrated; and means for coupling the system transmitter to said first-named means to initiate each such train of oscillations in time-phase with the signal being instantaneously generated by said system.

4. In a signal generator for enabling the calibration of a frequency-modulated distance-determining system including a transmitter and a receiver, the frequency of said transmitter being recurrently swept through a predetermined frequency band: means for generating electrical oscillations; means for quenching said oscillations whereby each free-running period thereof is substantially equal to the time-equivalent of a predetermined distance at which said system is to be calibrated; and means for coupling the system transmitter to said first-named means to initiate each train of said oscillations in time-phase with the signal being instantaneously generated by said system.

5. In a signal generator for enabling the calibration of a frequency-modulated distance-determining system including a transmitter and a receiver, the frequency of said transmitter being recurrently swept through a predetermined frequency band: an amplitude-modulated, vacuum-tube oscillator for recurrently generating a train of electrical oscillations: the period during which each such train of oscillations is generated being substantially equal to the time-equivalent of a predetermined distance at which said system is to be calibrated; and means for coupling the system transmitter to said oscillator to initiate each such train of oscillations in time-phase with the signal being instantaneously generated by said system.

6. In a signal generator for enabling the calibration of a frequency-modulated distance-determining system including a transmitter and a receiver, the frequency of said transmitter being recurrently swept through a predetermined frequency band: means for recurrently generating a train of electrical oscillations; the period during which each such train of oscillations is generated being substantially equal to the time-equivalent of a predetermined distance at which said system is to be calibrated; means for initiating each such train of oscillations in time-phase with the signal being instantaneously generated by said system; and means for conveying said oscillations to the system receiver for heterodyning the same with the output of the system transmitter, whereby a succession of beat-frequency signals is produced including an average voltage varying in magnitude at a frequency corresponding to that obtained during normal system operation at said predetermined distance.

7. In a signal generator for enabling the calibration of a frequency-modulated distance-determining system including a transmitter and a receiver, the frequency of said transmitter being recurrently swept through a predetermined frequency band: means for generating electrical oscillations; means for quenching said oscillations whereby each free-running period thereof is substantially equal to the time-equivalent of a predetermined distance at which said system is to be calibrated; means for initiating each train of said oscillations in time-phase with the signal being instantaneously generated by said system; and means for conveying said oscillations to the system receiver for heterodyning the same with the output of the system transmitter, whereby a succession of beat-frequency signals is produced including an average voltage varying in magnitude at a frequency corresponding to that obtained during normal system operation at said predetermined distance.

8. In a signal generator for enabling the calibration of a frequency-modulated distance-determining system including a transmitter and a receiver, the frequency of said transmitter being recurrently swept through a predetermined frequency band; means for recurrently generating a train of electrical oscillations: the period during which each such train of oscillations is generated being substantially equal to the time-equivalent of a predetermined distance at which said system is to be calibrated; means for coupling a portion of the system transmitter output to said first-named means to initiate each such train of oscillations in time-phase with the signal being instantaneously generated by said system; and means for conveying said oscillations to the system receiver for heterodyning the same with the output of the system transmitter, whereby a succession of beat-frequency signals is produced including an average voltage varying in magnitude at a frequency corresponding to that obtained during normal system operation at said predetermined distance.

9. In a signal generator for enabling the calibration of a frequency-modulated distance-determining system including a transmitter and a receiver, the frequency of said transmitter being recurrently swept through a predetermined frequency band: means for generating electrical oscillations; means for quenching said oscillations whereby each free-running period thereof is substantially equal to the time-equivalent of a predetermined distance at which said system is to be calibrated; means for coupling a portion of the system transmitter output to said first-named means to initiate each train of said oscillations in time-phase with the signal being instantaneously generated by said system; and means for conveying said oscillations to the system receiver for heterodyning the same with the output of the system transmitter, whereby a succession of beat-frequency signals is produced including an average voltage varying in magnitude at a frequency corresponding to that obtained during normal system operation at said predetermined distance.

10. In a signal generator for enabling the calibration of a frequency-modulated distance-determining system including a transmitter and a receiver, the frequency of said transmitter being recurrently swept through a predetermined frequency band: means for generating electrical oscillations; means for quenching said oscillations whereby each free-running period thereof is substantially equal to the time-equivalent of a predetermined distance at which said system is to be calibrated; said quenching means including a vacuum-tube oscillator, a resonant circuit adapted to be shock excited by said last-named oscillator, means for deriving a pulse from the output of said resonant circuit, and means for applying said pulse to said first-named oscillations generator; and means for initiating each train of said oscillations in time-phase with the signal being instantaneously generated by said system.

11. In a signal generator for enabling the calibration of a frequency-modulated distance-determining system including a transmitter and a receiver, the frequency of said transmitter being recurrently swept through a predetermined frequency band: means for generating electrical oscillations; means for quenching said oscillations whereby each free-running period thereof is substantially equal to the time-equivalent of a predetermined distance at which said system is to be calibrated; said quenching means including a vacuum-tube oscillator, a resonant circuit adapted to be shock excited by said last-named oscillator, means for deriving a pulse from the output of said resonant circuit, and means for applying said pulse to said first-named oscillations generator; and means for coupling a portion of the system transmitter output to said first-named means to initiate each train of said oscillations in time-phase with the signal being instantaneously generated by said system.

12. In a signal generator for enabling the calibration of a frequency-modulated distance-determining system including a transmitter and a receiver, the frequency of said transmitter being recurrently swept through a predetermined frequency band: means for generating electrical oscillations; means for quenching said oscillations whereby each free-running period thereof is substantially equal to the time-equivalent of a predetermined distance at which said system is to be calibrated; said quenching means including a vacuum-tube oscillator, a resonant circuit adapted to be shock excited by said last-named oscillator, means for deriving a pulse from the output of said resonant circuit, and means for applying said pulse to said first-named oscillations generator; means for coupling a portion of the system transmitter output to said first-named means to initiate each train of said oscillations in time-phase with the signal being instantaneously generated by said system; and means for coupling said oscillations to the system receiver for heterodyning the same with the output of the system transmitter, whereby a succession of beat-frequency signals is produced including an average voltage varying in magnitude at a frequency corresponding to that obtained during normal system operation at said predetermined distance.

13. In a signal generator for enabling the calibration of a frequency-modulated distance-determining system including a transmitter and a receiver, the frequency of said transmitter being recurrently swept through a predetermined frequency band: means for recurrently generating a train of electrical oscillations: the period during which each such train of oscillations is generated being substantially equal to the time-equivalent of a predetermined distance at which said system is to be calibrated; means for initiating each such train of oscillations in time-phase with the signal being instantaneously generated by said system; and means for coupling said oscillations to the system receiver for heterodyning the same with the output of the system transmitter, whereby a succession of beat-frequency signals is produced including a voltage varying in magnitude at a frequency corresponding to that obtained during normal system operation at said predetermined distance.

14. In a signal generator for enabling the calibration of a frequency-modulated distance-determining system including a transmitter and a receiver, the frequency of said transmitter being recurrently swept through a predetermined frequency band: means for generating electrical oscillations; means for quenching said oscillations whereby each free-running period thereof is substantially equal to the time-equivalent of a predetermined distance at which said system is to be calibrated; means for initiating each train of said oscillations in time-phase with the signal being instantaneously generated by said system; and means for coupling said oscillations to the system receiver for heterodyning the same with the output of the system transmitter, whereby a succession of beat-frequency signals is produced including a voltage varying in magnitude at a frequency corresponding to that obtained during normal system operation at said predetermined distance.

ROYDEN C. SANDERS, JR.
WILLIAM R. MERCER.

REFERENCES CITED

The following references are of record in the file of this patent:

UNITED STATES PATENTS

| Number | Name | Date |
|---|---|---|
| 2,301,929 | Budenbom | Nov. 17, 1942 |
| 2,402,385 | Eaton | June 18, 1946 |
| 2,407,000 | Evans | Sept. 3, 1946 |
| 2,409,577 | Matson, Jr. | Oct. 15, 1946 |
| 2,415,095 | Varian | Feb. 4, 1947 |
| 2,423,644 | Evans | July 8, 1947 |
| 2,433,804 | Wolff | Dec. 30, 1947 |
| 2,450,945 | Eaton | Oct. 12, 1948 |
| 2,450,946 | Evans | Oct. 12, 1948 |
| 2,468,097 | Moore | Apr. 26, 1949 |